(12) United States Patent
Hofer et al.

(10) Patent No.: US 7,009,642 B2
(45) Date of Patent: *Mar. 7, 2006

(54) METHOD AND APPARATUS FOR DETECTING THE PRESENCE OF ARTIFICIAL ILLUMINATION IN A SCENE

(75) Inventors: Gregory V Hofer, Loveland, CO (US); Jason E Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

This patent is subject to a terminal disclaimer.

(21) Appl. No.: 10/002,355

(22) Filed: Oct. 30, 2001

(65) Prior Publication Data

US 2003/0081138 A1 May 1, 2003

(51) Int. Cl.
*H04N 9/73* (2006.01)

(52) U.S. Cl. .................. 348/226.1; 348/362; 382/270; 382/274; 396/155

(58) Field of Classification Search ................ 348/362, 348/221.1, 223.1, 226.1, 228.1; 382/162, 382/167, 274; 396/155, 270
See application file for complete search history.

(56) References Cited

U.S. PATENT DOCUMENTS

| 4,079,388 | A | | 3/1978 | Takahama et al. ............ 354/31 |
| 5,053,871 | A | * | 10/1991 | Ogawa et al. ............. 348/366 |
| 5,495,313 | A | * | 2/1996 | Kai ............................ 396/96 |
| 5,515,132 | A | * | 5/1996 | Iwasaki ..................... 396/234 |
| 5,701,526 | A | * | 12/1997 | Iwasaki ..................... 396/234 |
| 5,905,529 | A | * | 5/1999 | Inuiya et al. ............. 348/221.1 |
| 6,501,518 | B1 | * | 12/2002 | Smith et al. ............. 348/425.3 |

* cited by examiner

*Primary Examiner*—Thai Tran
*Assistant Examiner*—Gary C. Vieaux

(57) ABSTRACT

A method and apparatus for detecting the presence of artificial illumination in a scene powered by alternating current by sampling the light in a scene at a periodic rate.

25 Claims, 6 Drawing Sheets

METHOD AND APPARATUS FOR DETECTING THE PRESENCE OF ARTIFICIAL ILLUMINATION IN A SCENE

RELATED APPLICATIONS

This application is related to the following application: "Color correction for a scene based on the detection of artificial illumination in the scene" of Gregory V. Hofer et al., application Ser. No. 10/002,701; "A method and apparatus for auto-exposure control in the presence of artificial illumination" of Gregory V. Hofer at al., application Ser. No. 10/002,702; and "A method and apparatus for auto-focus control in the presence of artificial illumination" of Gregory V. Hofer et al., application Ser. No. 10/002,349, All three applications were filed on the same day as this application.

FIELD OF THE INVENTION

The present invention relates generally to detecting scene illumination and more specifically to a method and device that can detect the presence of artificial illumination in a scene.

BACKGROUND OF THE INVENTION

When capturing an image with a digital camera, the source of the illumination for the scene affects the colors captured with the camera. For indoor scenes the illumination source can vary widely and can include a tungsten bulb, halogen lamps, fluorescent lamps, sunlight coming in through a window, or even a xenon light. Each of these types of light sources has a different spectral energy distribution. The types of light sources that create light using a filament glowing at a high temperature (for example tungsten bulbs) are typically characterized by a color temperature defined as a Planckian radiator with a temperature of 50 degrees higher than the filament of the light. The sun can also be characterized as a Planckian radiator but the loss of some wavelengths through scattering and absorption in the atmosphere causes significant differences from the Planckian radiator at those wavelengths. Because of the variation in the spectral power distribution of the sun, standard spectral power distribution curves have been developed. One of the standard curves is called D65 corresponding to a color temperature of 6500K. Clouds in the sky can also affect the spectral distribution of energy reaching the scene from the sun. The time of day also affects the color temperature of the sun (noon vs. sunrise). The color temperature can be affected by whether the object is in direct sun light or in shadows.

The types of light sources that excite a phosphor layer that then fluoresces (for example fluorescent lamps and xenon lamps) tend to have spectral distributions that are unique to the phosphors in the lamp in combination with the mercury vapor spectrum.

Each of these light sources has a different spectral power distribution that affects the colors captured in a scene by a camera. For example when you have a white object illuminated by a tungsten bulb the white object will appear yellow in the scene captured by the camera. This is because the tungsten bulb does not produce much blue light. A white object is an object that reflects a similar amount of the red, green and blue light that hits the object. When a white object is illuminated by a tungsten bulb more red light is hitting the object than blue light and therefore more red light is reflected, causing the object to look yellow to the camera.

The human eye adjusts to different illuminates and compensates for the color shift but a camera records the actual light in the scene.

Fortunately these color shifts caused by the illumination source can be corrected. This correction is typically called white balancing. For proper white balancing the illuminant of the scene must be known. There are a number of methods currently used to try to determine the scene illuminant to be used in white balancing.

One method looks for the brightest point in a scene and assumes that it should be white. The brightest point is then adjusted until it is white and then this adjustment is used to balance the rest of the scene. This method operates on the assumption that the brightest point in a scene is from a white object or from a specular reflection. For example the specular reflection coming from a car windshield. Obviously not all scenes have the brightest point as a specular reflection or a white object. When this method is used on a scene with a non-white object that is the brightest point in the scene it can result in significant color mismatch. Another method of white balancing adjusts the image until the sum of all the areas in the image adds up to a neutral gray. Both of these methods operate on assumptions about the content of the scene.

Another method uses a correlation matrix memory to map the image data onto color image data under a number of different illuminants. This method is described in U.S. Pat. No. 6,038,339 "White point determination using correlation matrix memory" inventers Paul M. Hubel et al. that is hereby incorporated by reference. When using this method the image data needs to be mapped onto the color data for all potential illuminants. Mapping the image data onto each of the potential illuminants is a computational process. If the set of potential illuminants could be narrowed to the type of illuminant (for example daylight) the amount of computation, and therefore the time could be reduced. One way to narrow the set of potential illuminants is to determine if the scene contains artificial illumination. Therefore the ability to detect the presence of artificial illumination can increase the speed and accuracy of the color correction algorithms inside digital cameras.

Typically most artificial illumination sources are powered by alternating current. There are two main frequencies for alternating current. The United States uses 60 Hz and Europe uses 50 Hz. At these speeds, the human eye typically does not detect variations in the brightness of the artificial illuminant. However, digital cameras and other devices that detect light using today's photo sensors can and do detect the variation in brightness due to the alternating current (AC) driving most artificial illumination sources. The brightness variation typically is larger under fluorescent illumination sources and smaller under incandescent illumination sources. These variations in intensity can cause problems for some of the automatic functions in digital cameras like auto-focus and auto-exposure.

When using the auto-exposure function, the camera adjusts the lens aperture, the exposure length and gain of the photo sensor to gather the correct amount of light for a proper exposure. The auto-exposure function relies on accurate measurements of the amount of light within the scene to set the exposure parameters. The exposure lengths for photo sensors, typically a CCD, when measuring light for the automatic-exposure function has a typical range from 1/60 to 1/1000 of a second. Exposure measurement errors can be large if the exposure lengths are smaller than the period of the driving frequency of the AC power source. When scene illumination varies because of artificial illumination, incorrect final image exposure may result if the variation in intensity is not taken into account.

When using the auto-focus function, the camera adjusts the position of the lens to focus the scene on the photo sensor. Typically cameras use a measure of contrast between areas in the scene to determine proper focus. The auto focus algorithm typically takes multiple exposures of a scene with the lens in different positions, and then selects the lens position corresponding to the exposure with the highest contrast. Unfortunately the level of illumination in the scene affects the contrast in a scene. This can result in a high focus-contrast measurement during a bright part of the artificial light source cycle and a low focus-contrast measurement during a dimmer part of the light source cycle. If the light is brighter during an out-of-focus focus-contrast measurement, the out-of-focus position may be chosen as best unless this variation in intensity is taken into account. Therefore there is a need for a system that can determine the presence of artificial illumination in a scene.

SUMMARY OF THE INVENTION

A method and apparatus for detecting the presence, in a scene, of artificial illumination that is powered by alternating current is disclosed. By sampling the light in a scene the presence of artificial illumination can be detected.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

A method and apparatus that can detect the presence of artificial illumination in a scene can improve digital cameras and other devices that capture scenes using photo sensors.

Figure 1:
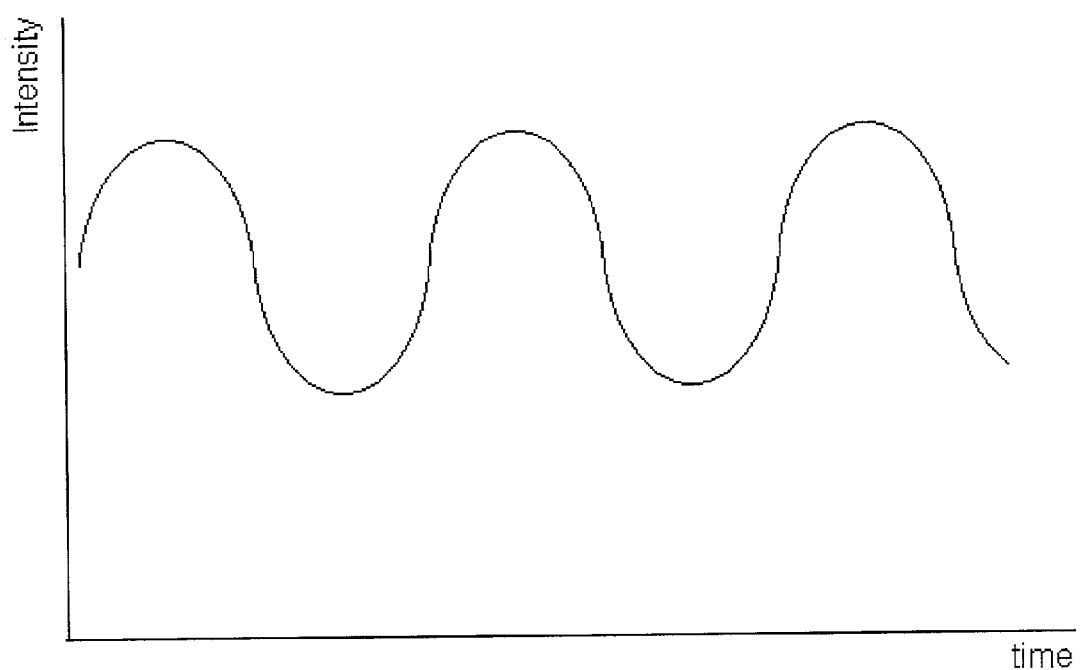
FIG. 1 is a chart of the variation in intensity of an artificial illuminant powered by alternating current.

Artificial illumination is typically powered by alternating current. There are two main frequencies for alternating current. The United States uses 60 Hz and Europe uses 50 Hz. The alternating current driving artificial illumination causes the intensity of the illumination to vary at twice the driving frequency. The intensity variation is dependent on the type of artificial illumination. Incandescent lights typically have smaller intensity variations than fluorescent lights. The intensity variations typically follow a fluctuating variation at twice the rate of the sinusoidal variation in the alternating current (see FIG. 1). By sampling the light in a scene, the presence of an artificial illuminant can be determined. Photo sensors today, typically charged coupled devices (CCD), can change the time between exposures (sample rate) as well as exposure lengths.

Figure 2:
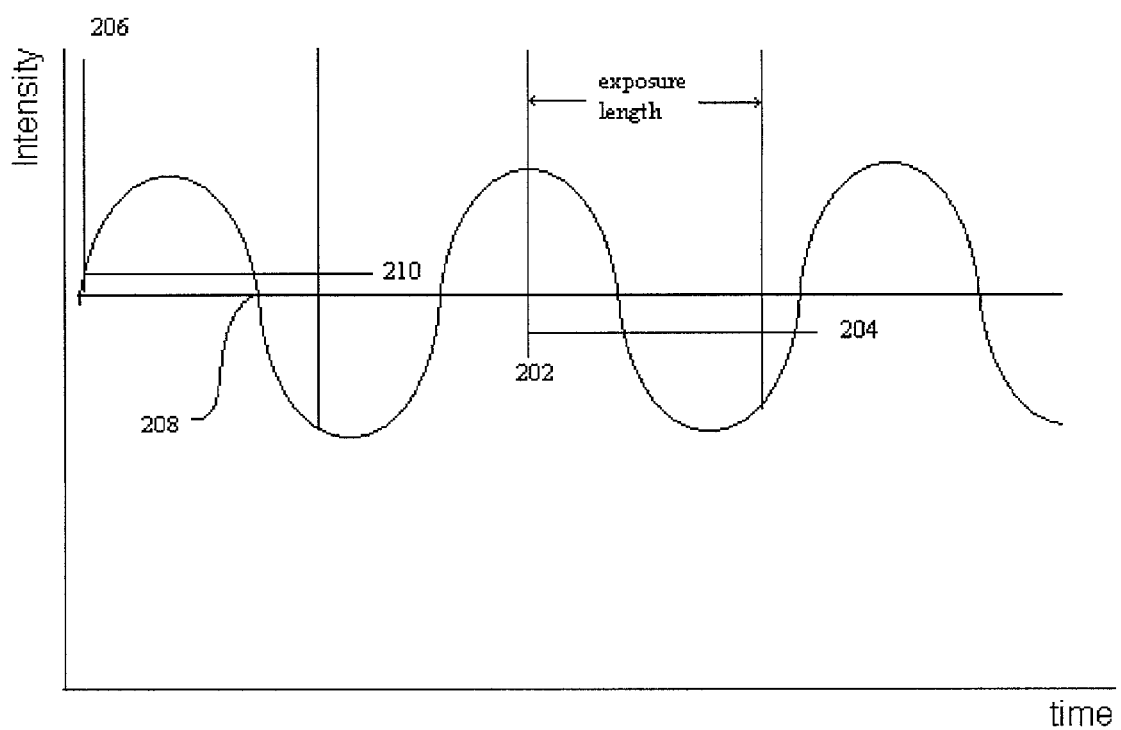
FIG. 2 is a chart of the variation in intensity of an artificial illuminant powered by alternating current sampled using an exposure length not equal to the period of the AC frequency.

In one embodiment of the current invention the exposure length is adjusted such that the exposure length is not equal to the period or multiple of any of the common AC frequencies. The two most common AC frequencies are 60 Hz and 50 Hz therefore the two most common illumination periods are $1/120$ second and $1/100$ second. An example exposure length that is not equal to the period of these two AC frequencies is $1/140$ second, this is just an example and many other exposure lengths could be used. A number of exposures are taken using this exposure length. The sample rate or time between exposures is not critical but should not match any of the expected AC frequencies. The overall brightness of the scene is calculated for each exposure, using methods well know in the arts, for example averaging the light for all the pixels in the scene. The overall brightness for each exposure is compared for variability between exposures. Because the exposure length is different than the AC period the average intensity of light during the exposure will be different depending on the phase of the driving AC at the start of the exposure (see FIG. 2).

When the exposure starts at time 202 the AC is falling toward its minimum and the average light intensity 204 during the exposure will be low. When the exposure time starts at time 206 the AC is starting to reach its peak 208 and the average light intensity during the exposure will be higher 210. These changes in average light intensity will be detected as variability in the average brightness between the multiple exposures taken. If there is low variability then the amount of artificial illumination in the scene is low. If there is higher variability then the amount of artificial illumination in the scene is high. The variability in the overall brightness can be compared to a threshold value and when the variability is higher than the threshold the scene contains an artificial illuminant.

Figure 3:
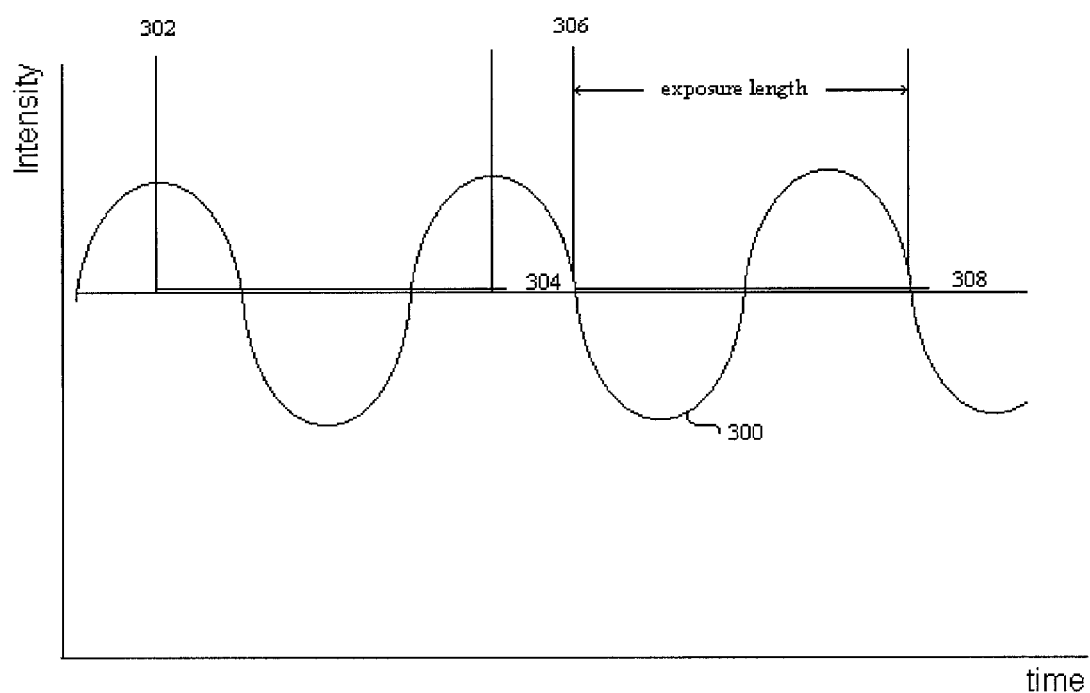
FIG. 3 is a chart of the variation in intensity of an artificial illuminant powered by alternating current sampled using an exposure length equal to the period of the AC frequency.

Once the presence of artificial illumination has been detected the frequency of the AC can be determined. The exposure length is adjusted to match the period or a multiple of the period of one of the common AC frequencies. A number of exposures are taken and the average brightness of the scene for each exposure is once again calculated. When the exposure length matches the period of the AC frequency the variability between the exposures will be reduced (see FIG. 3). The variability is reduced because wherever the exposure starts the full period of the driving AC is included in the exposure and the average light intensity is the same. Exposure 302 starts as the phase is nearing its peak and has average intensity of 304. Exposure 306 starts as the AC is reaching the cross over point and has an average intensity of 308. There is low variability between level 304 and 308 therefore the exposure length must match the period of waveform 300. Table 1 shows the variability in scene brightness for fluorescent lights at 50 Hz and 60 Hz and sunlight.

TABLE 1

| Light source type - AC frequency | Exposure length | Variability |
| --- | --- | --- |
| Artificial - 60 Hz AC | 1/(60*2) | 17 |
| Artificial - 60 Hz AC | 1/(50*2) | 426 |

TABLE 1-continued

| Light source type - AC frequency | Exposure length | Variability |
|---|---|---|
| Artificial - 50 Hz AC | 1/(60*2) | 293 |
| Artificial - 50 Hz AC | 1/(50*2) | 5 |
| Sunlight | 1/(60*2) | 11 |
| Sunlight | 1/(50*2) | 7 |

If the variability is still high the process is repeated with a different exposure length until an exposure length is found that reduces the variability. The exposure length that reduces the variability will be the period of the driving AC frequency.

In another embodiment the first exposure length is chosen to match a period of one of the common AC frequencies, for example 60 Hz. Multiple exposures are taken and the variability between exposures is calculated. The sample rate or time between exposures is not critical but in the preferred embodiment would be an integer multiple of the exposure time. If there is high variability an artificial illuminant is present and the process is repeated with a different exposure length to determine the frequency of the driving AC. If there is low variability it could be because of two reasons. It could either be caused by having little or no artificial illumination in the scene or it could be caused by the AC period matching the exposure length. This can be determined by changing the exposure length to match a different AC frequency than the first exposure length. Using the second exposure time a number of exposures are taken and the variability in brightness between exposures is calculated. A low amount of variability indicates a low amount of artificial illumination in the scene. If the variability is now higher then artificial illumination is present in the scene and the artificial illumination is being driven at the frequency that the first exposure length was matched with.

Figure 4:
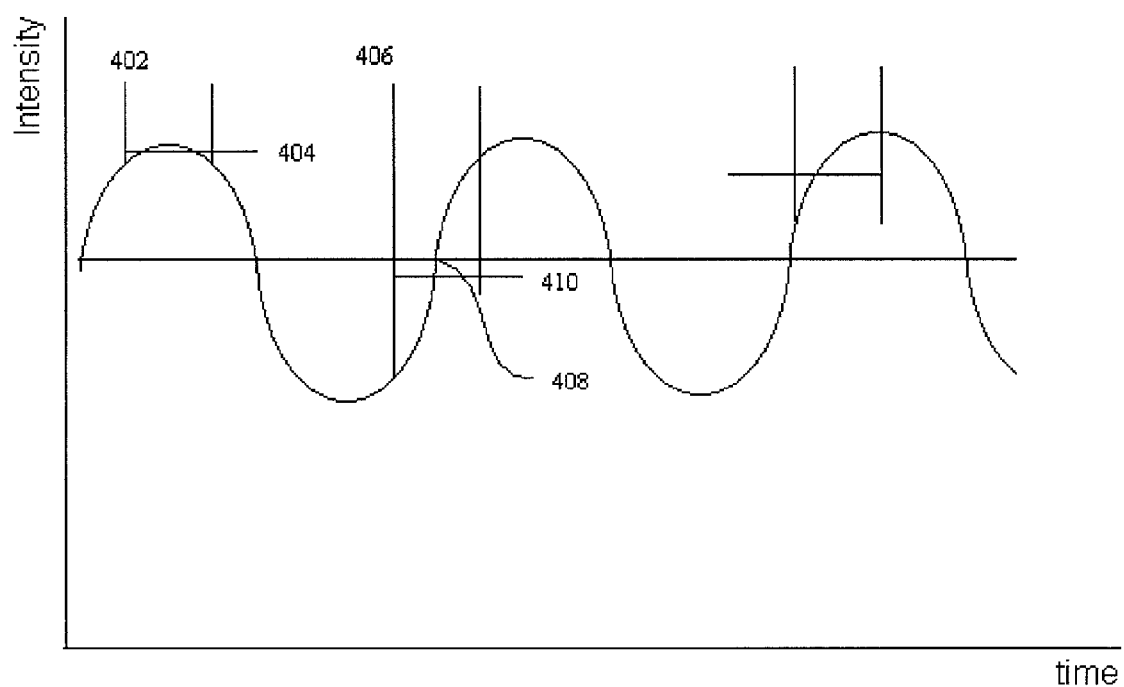
FIG. 4 is a chart of the variation in intensity of an artificial illuminant powered by alternating current sampled using an exposure length much smaller than the period of the AC frequency.
Figure 5:
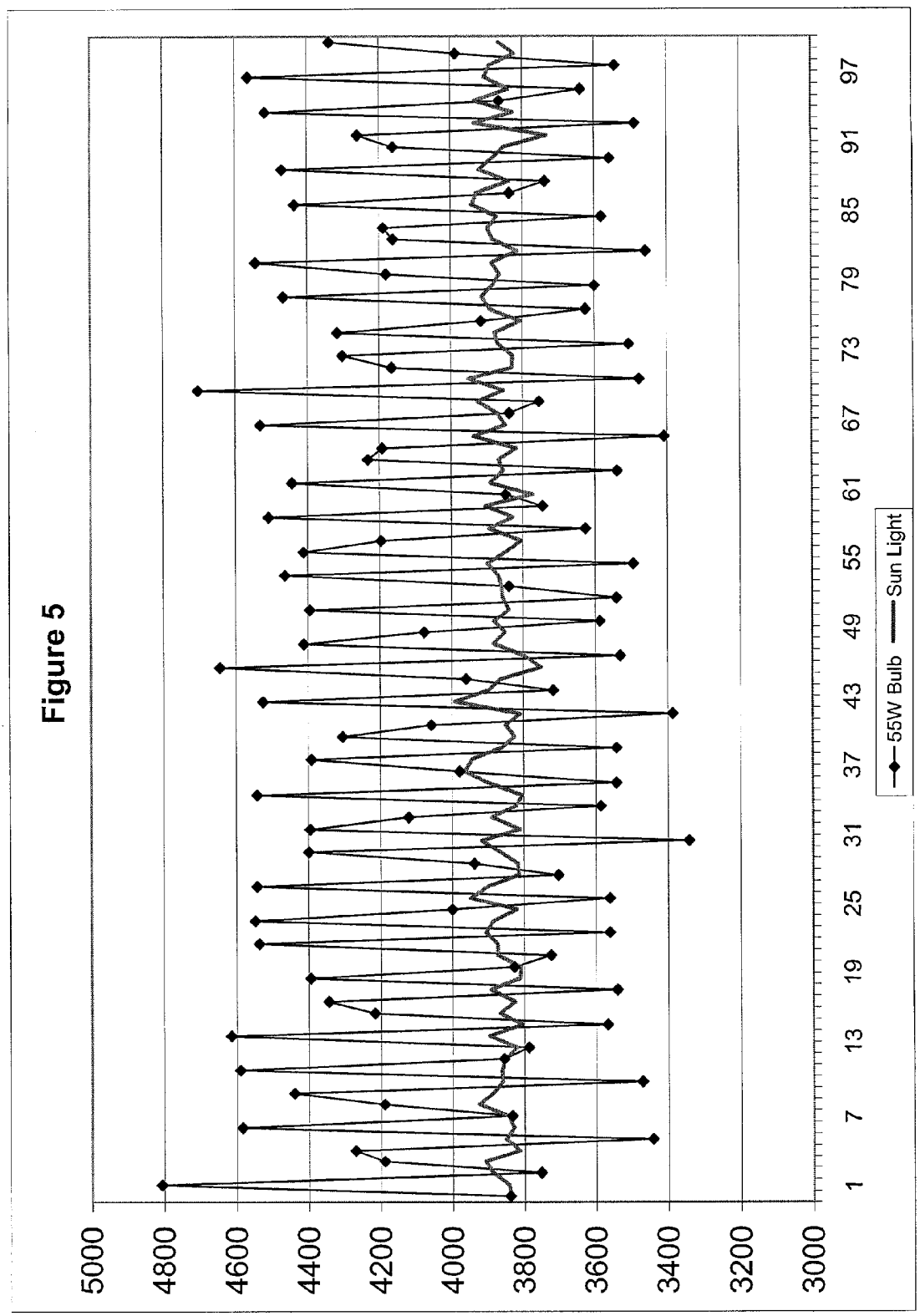
FIG. 5 is a chart showing a waveform sampled at a different frequency than the waveform.

In another embodiment of the present invention the exposure length is chosen to be much smaller than the period of any of the common AC frequencies. In the preferred embodiment the exposure length would be much smaller than ½ the smallest period of any of the common AC frequencies. 60 Hz has a light intensity fluctuation period of 1/120 of a second, ½ of that is 1/240 of a second. Therefore in the preferred embodiment the exposure length would be 1/480 of a second or shorter. Using this short exposure length multiple exposures would be taken with a sample rate that does not synchronize phase with light fluctuations from any of the common AC frequencies. The overall brightness of each exposure would be calculated and the variability in brightness between the different exposures would be calculated. Because the time between exposures is different than the AC period the average intensity of light during the exposure will be different depending on the phase of the driving AC at the start of the exposure (see FIG. 4). When the exposure starts at time 402 the AC is starting to reach its peak and the average light intensity 404 during the exposure will be high. When the exposure time starts at time 406 the AC is starting to reach the cross over point 408 and the average light intensity during the exposure will be lower 410. These changes in average light intensity will be detected as variability in the average brightness between the multiple exposures taken. High variability indicates the presence of artificial illumination. FIG. 5 is a chart showing the results of sampling a waveform at a different frequency than the waveform. Once artificial illumination is detected in the scene the frequency and the phase of the variation in intensity can be determined.

General sampling theory states that to determine the frequency and phase of a waveform the sampling rate must be at least twice the frequency of the waveform (the Nyquist limit). However determining the frequency and phase of a waveform that is constrained to a few well-known frequencies of a known shape, for example a sine wave, does not require sampling at twice the frequency. This is because the reflections of the base frequency and the harmonics of the base frequency are used to differentiate between the few expected frequencies. Analyzing a sampled waveform using Fast Fourier Transforms (FFT), and discarding the frequency results that don't match the few common AC frequencies, allows the frequency and phase of the light variations to be determined.

Another way to determine the frequency is to adjust the start of each of the exposures to be synchronized in phase with one of the common AC frequencies and then recording the brightness for a number of exposures. This process is repeated with other common frequencies until the variability of the average light intensity between exposures is found to be smaller at one frequency than the other. The reduced variability occurs because the average intensity of each sample will be approximately the same when each exposure starts at the same place on the waveform. Once the frequency has been determined the phase can be determined by moving the starting exposure time along the period of the waveform while looking for minimum or maximum brightness levels in the measured light.

In another embodiment of the present invention the exposure length is chosen to be much smaller than the period of any of the common AC frequencies. In the preferred embodiment the exposure length would be much smaller than ½ the smallest period of any of the common AC frequencies. 60 Hz has a light intensity fluctuation period of 1/120 of a second, ½ of that is 1/240 of a second. Therefore in the preferred embodiment the exposure length would be 1/480th of a second or shorter. Using this short exposure length multiple exposures would be taken using a sample rate that was matched to one of the common AC frequencies. The overall brightness of each exposure would be calculated and the variability in brightness between the different exposures would be calculated. If there is high variability an artificial illuminant is present and the process is can be repeated with a different sampling rate to determine the frequency of the driving AC. If there is low variability it could be because of two reasons. It could either be caused either by having little or no artificial illumination in the scene or it could be caused by the AC period matching the sampling rate. This can be determined by changing the sampling rate to match a different AC frequency than the first sampling rate. Using the second sampling rate a number of exposures are taken and the variability in brightness between exposures is calculated. A low amount of variability indicates a low amount of artificial illumination in the scene. If the variability is now higher then artificial illumination is present in the scene and the artificial illumination is being driven at the frequency that the first sampling rate was matched with.

Figure 6:
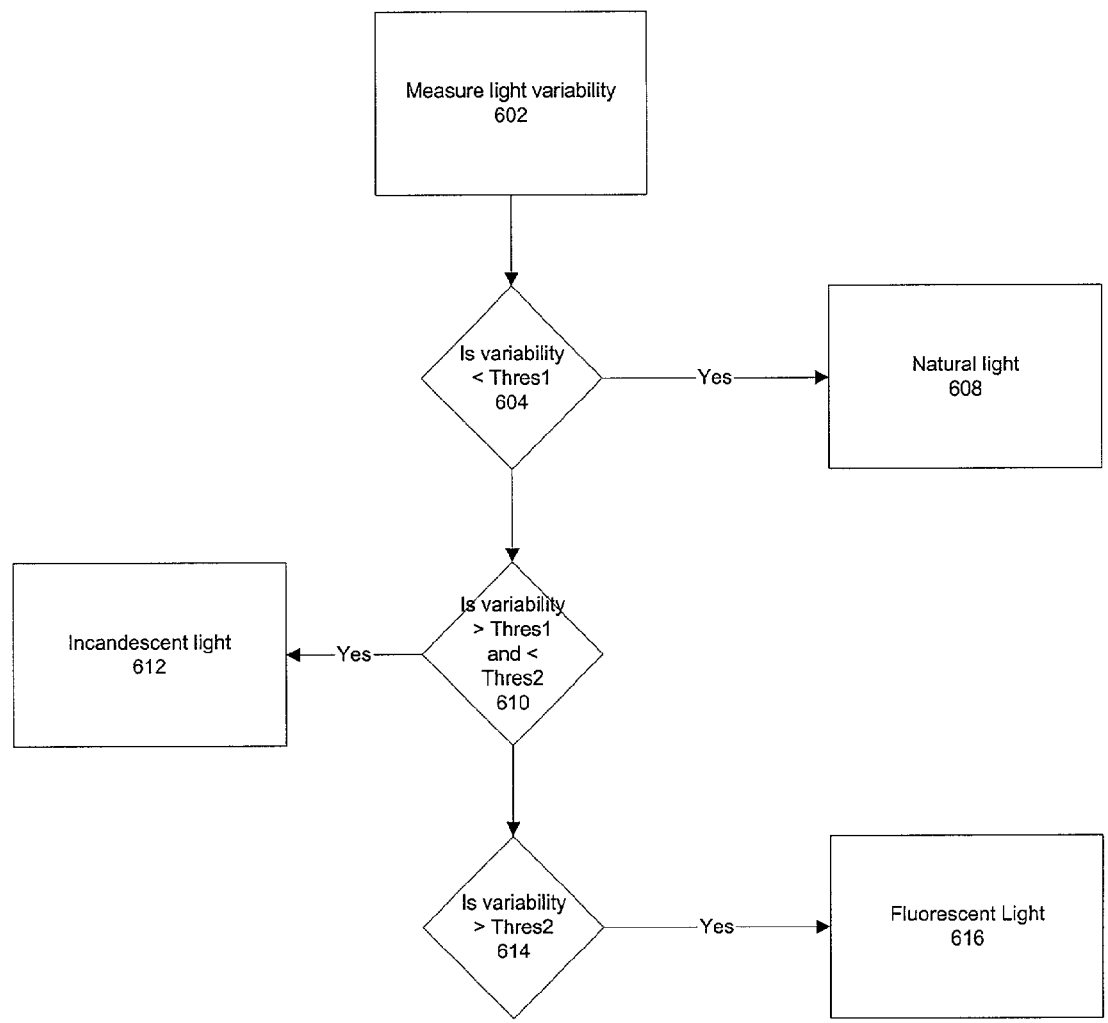
FIG. 6 is a flowchart showing one embodiment of the current invention where the amount of variability indicates the type of light in a scene.

In another embodiment of the current invention the contrast in the scene is used instead of the overall brightness level in the scene to determine the presence of artificial illumination. Scene contrast is typically used in camera auto-focus algorithms. There are many different ways, well known in the arts, to calculate scene contrast. One way is to take the difference in intensity between adjacent pixels. Because scene contrast is dependent on overall levels of scene illumination, variations in scene illumination can be detected by changes in scene contrast. Scene contrast is also dependent on how well focused the scene is onto the photo sensor. When the scene is well focused, changes in scene brightness can be more easily detected using scene contrast than when the scene is poorly focused. In the preferred embodiment when using scene contrast, the scene is focused onto the photo sensor with a lens before the detection for artificial illumination proceeds. In one embodiment using scene contrast, short exposure lengths are used and the sampling rate is chosen such that it does not match any common AC frequencies. Multiple exposures are taken and the overall contrast in each exposure is calculated. The variability in contrast between the different exposures is then calculated. High variability in the contrast between the exposures indicates the presence of artificial illumination. The variability is in general proportional to the amount of variation in the light source. The amount of variation in brightness and average brightness of the scene may be correlated to the type of light source (see FIG. 6). A fluorescent light source typically has a higher variability in contrast than an incandescent light source. When the variability is smaller than a first threshold (604) there is little, if any, artificial illumination in the scene (608). When the variability is larger than the first threshold but smaller than a second threshold (610) the variability indicates incandescent illumination (612). And when the variability is larger than the second threshold (614) the variability indicates fluorescent illumination (616).

When artificial illumination is detected in a scene the contrast measurements can be re-done using a sample rate that corresponds to one of the common AC frequencies. If the variation between the contrast measurements decreases then the correct AC frequency has been determined.

In another embodiment using contrast measurements with short exposure lengths, the sample rate is picked to match one of the common AC frequencies. If there are large variations in the contrast measurements then artificial illumination is present in the scene being driven at a different frequency than the sample rate. If the variation in contrast measurements are low, a second series of measurements is made at a second sampling rate corresponding to another common AC frequency. If the variation in contrast measurements for the second set of exposures are also low, then there is little artificial illumination in the scene. If the variability of the second set of contrast measurements is high, then there is artificial illumination in the scene being driven at the first AC frequency.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting artificial illumination in a scene, comprising:
   predicting at least one frequency for a variation in the illumination in the scene;
   measuring light from the scene at a periodic rate, wherein the periodic rate is different than any of the predicted frequencies, using an exposure length that is different than any of the periods of the predicted frequencies;
   detecting the presence of an artificial illuminant when the measured light from the scene contains periodic changes;
   choosing one of the predicted frequencies;
   re-measuring the light from the scene using a periodic rate that is an integer multiple of the chosen frequency; and
   confirming the actual frequency of the artificial illuminant by comparing the re-measured light for a reduction in the variability of the light intensity.

2. The method of claim 1, wherein the periodic changes are variations in brightness.

3. The method of claim 1, wherein the light from the scene is focused onto a photo sensor and the periodic changes are variations in contrast.

4. The method of claim 1, wherein the periodic rate is close to, but not equal to, twice a common AC frequency.

5. The method of claim 4, wherein the common AC frequency is 60 Hz.

6. The method of claim 4, wherein the common AC frequency is 50 Hz.

7. The method of claim 1, wherein the exposure length is smaller than one half of any of the periods of the predicted frequencies.

8. The method of claim 1, and further comprising:
   re-measuring the light from the scene using a periodic rate that is not an integer multiple of the chosen frequency;
   determining the phase of the periodic changes by detecting the positions of the intensity variations.

9. The method of claim 1, and further comprising determining the phase and frequency of the periodic changes with FFT analysis of the sampled light.

10. The method of claim 1, wherein where the exposure length is larger than one half of any of the periods of the predicted frequencies.

11. The method of claim 10, and further comprising:
    choosing one of the predicted frequencies;
    re-measuring the light from the scene using an exposure length that is an integer multiple of the chosen frequency;
    confirming the actual frequency of the artificial illuminant by comparing the re-measured light for a reduction in the variability of the light intensity.

12. A method of detecting artificial illumination in a scene, comprising:
    predicting a frequency for a variation in the illumination in the scene;
    measuring light from the scene at a periodic rate using an exposure length that is equal to the period of the predicted frequency;
    detecting the presence of an artificial illuminant when the variability of the measured light is high.

13. The method of claim 12, further comprising:
    re-measuring light from the scene at a periodic rate using an exposure length that is equal to the period of a second predicted frequency;
    detecting the presence of an artificial illuminant when the variability of the re-measured light is high; and determining that the scene contains only small amounts of artificial illumination when the variability of the re-measured light is low.

14. A method of detecting artificial illumination in a scene, the method comprising:
predicting a frequency for a variation in the illumination in the scene;
measuring light from the scene at a periodic rate, wherein the periodic rate is equal to an integer multiple of the predicted frequency, using an exposure time that is different than the period of any of the predicted frequencies; and
detecting the presence of an artificial illuminant when the variability of the measured light is high.

15. The method of claim 14, further comprising:
re-measuring light from the scene at a second periodic rate, wherein the second periodic rate corresponds to a second predicted frequency;
detecting the presence of an artificial illuminant when the variability of the re-measured light is high; and
determining that the scene contains only small amounts of artificial illumination when the variability of the re-measured light is low.

16. An apparatus for detecting artificial illumination in a scene, the apparatus comprising:
a photo sensor array, the photo sensor array configured to measure light from the scene at a preselected frequency using a predetermined exposure time, wherein the preselected frequency is approximately twice a frequency of a power source supplying an artificial illuminate, but not equal to twice the frequency of the power source; and
a processor, the processor configured to determine the presence of an artificial illuminant by examining the measured light from the scene for periodic intensity variations.

17. The apparatus of claim 16, wherein the frequency of the power source is 60 Hz.

18. The apparatus of claim 16, wherein the frequency of the power source is 50 Hz.

19. An apparatus for detecting artificial illumination in a scene, the apparatus comprising:
a photo sensor array, the photo sensor array configured to measure light emitted from the scene at a preselected frequency using a predetermined exposure time, wherein the preselected frequency is approximately twice a frequency of a power source supplying an artificial illuminate, but not equal to twice the frequency of the power source;
a lens configured to focus the light from the scene onto the photo sensor array;
a processor, the processor configured to determine the presence of an artificial illuminant by examining the measured light from the scene for periodic contrast variations.

20. An apparatus for detecting artificial illumination in a scene, the apparatus comprising:
a means for measuring light from the scene at a preselected frequency using a predetermined exposure time, wherein the preselected frequency is approximately twice a frequency of a power source supplying an artificial illuminate, but not equal to twice the frequency of the power source; and
a means for determining the presence of an artificial illuminant by examining the measured light form the scene for periodic intensity variations.

21. A digital camera comprising:
a photo sensor array, the photosensor army configured to measure light from a scene at a preselected frequency using a predetermined exposure length, wherein the preselected frequency is approximately twice a frequency of a power source supplying an artificial illuminate, but not equal to twice the frequency of the power source;
a lens configured to focus the light from the scene onto the photo sensor array; and
a processor, the processor configured to determine the presence of an artificial illuminant by examining the measured light from the scene for periodic variations.

22. A method of determining the illumination type in a scene, the method comprising:
predicting at least one frequency for a variation in the illumination in the scene;
measuring light from the scene at a periodic rate, wherein the periodic rate is different than any of the predicted frequencies, using an exposure length that is different than any of the periods of the predicted frequencies;
comparing the variability of the measured light to a first threshold;
detecting natural illumination when the variability of the measured light is below the first threshold; and
detecting artificial illumination when the variability of the measured light is above the first threshold.

23. The method of claim 22, further comprising:
comparing the variability of the measured light to a second threshold, wherein the second threshold is higher than the first threshold;
detecting incandescent illumination when the variability of the measured light is below the second threshold and above the first threshold; and
detecting fluorescent illumination when the variability of the measured light is above the second threshold.

24. The apparatus of claim 16, wherein the processor is configured to determine the presence of an artificial illuminant if the intensity of the measured light from the scene varies by more than a predetermined value.

25. The apparatus of claim 19, wherein the processor is configured to determine the presence of an artificial illuminant if the intensity of the measured light from the scene varies by more than a predetermined value.

* * * * *

UNITED STATES PATENT AND TRADEMARK OFFICE
CERTIFICATE OF CORRECTION

PATENT NO. : 7,009,642 B2 Page 1 of 1
APPLICATION NO. : 10/002355
DATED : March 7, 2006
INVENTOR(S) : Gregory V Hofer et al.

It is certified that error appears in the above-identified patent and that said Letters Patent is hereby corrected as shown below:

In column 8, line 25, in Claim 4, after "twice" delete "a" and insert -- the --, therefor.

In column 8, line 42, in Claim 10, after "wherein" delete "where".

In column 9, line 50, in Claim 19, after "focus" delete "the".

In column 9, line 50, in Claim 19, after "light" insert -- emitted --.

In column 10, line 8, in Claim 20, delete "form" and insert -- from --, therefor.

In column 10, line 11, in Claim 21, delete "army" and insert -- array --, therefor.

Signed and Sealed this

Twelfth Day of May, 2009

JOHN DOLL
*Acting Director of the United States Patent and Trademark Office*